Patented Feb. 28, 1928.

1,661,052

UNITED STATES PATENT OFFICE.

GOTTHILF SCHULDT, OF STUTTGART, GERMANY.

SOLDER FOR ALUMINUM AND ALUMINUM ALLOYS.

No Drawing. Application filed June 14, 1926, Serial No. 116,018, and in Germany June 15, 1925.

This invention relates to a process for the production of a solder for aluminum and aluminum alloys, having up to 70 per cent aluminum alloyed with tin, zinc, copper, iron, silicon, and lithium or the alloy, consisting of 10 to 14 parts of silicon in aluminum, known as "silumin". The percentage of aluminum may be varied between 30 and 70 per cent aluminum. The tin and zinc content may be altered at times in a corresponding manner, for instance in the ratio 1:2 in order to adapt the degree of fluidity of the solder to different types of articles, such as castings or sheets.

To make up 1 kgm. weight of the solder according to the invention, we may use:—
450 gm. aluminum.
370 gm. tin.
180 gm. zinc.
20 gm. copper.
15 gm. silicon.
10 gm. lithium or silumin.
5 gm. iron.

From these constituents, about 1 kgm. of the aluminum solder will be obtained in the final alloyed condition.

The solder may be produced in the following manner. The copper is first melted together with an equal weight of aluminum, in order to produce an alloy of lower melting point than the copper itself. The copper-aluminum alloy thus produced is then melted together with the iron and silicon. These constituents are thoroughly mixed, and the remainder of the aluminum, the zinc, tin, and lithium or silumin are added in turn to the fluid mass.

In order to clean the molten mass, or to remove the oxides therefrom, a chloride, for instance iron chloride, is added in very small quantities. By these means after quite a short time a dry mass of scum and slag separates on the surface of the fluid metal, and may be skimmed off, leaving the liquid clean and clear.

The solder has several advantageous properties. Its constitution renders it able to unite uniformly with the metal to be soldered. It may be particularly emphasized that the places to be soldered need not be specially prepared beforehand by removing the oxide film, and no special binding agent is necessary. There is thus very little difference of electrical potential between the soldered positions and the aluminum. The soldered place is thus not subject to disintegration, as is the case with known solders. The soldering will last so much longer, as is known, the smaller the electrical potential difference between the solder and the aluminum. When cold, the solder is characterized especially by its great adhesion and extreme strength. For instance, a tensile strength of up to 865kg./cm$^2$ is obtained with soldered parts. The tensile strength of rods produced entirely of solder is, in comparison, very much greater.

No cracks occur in the completed soldering, as has hitherto often been the case, this freedom from cracking being due to the relatively low working temperature, which may be about 450°. The soldered places may furthermore be highly polished, and will retain this polish; the solder may be given any desired tone, to correspond to that of the article soldered by slight modifications of the quantities of the added material, for instance, of the copper.

The properties of the solder render it possible to solder on and to mould pieces which have been broken off from objects, and parts which are to be specially applied, such as flanges, arms, ribs, pipes, eyes, and the like. An important economical advantage is thus procured, since, for instance faulty castings may be again made usable.

The solder may be used in such a way that, for instance, with strong aluminum sheet a solder which is not very fluid is applied by means of a soldering pistol, whereas with weak aluminum sheet, a readily fluid solder is applied by means of a blast soldering iron.

The process renders possible the production of a series of solders from which a solder may be selected which will be entirely suitable for the metal to be soldered, so that in all cases a satisfactory soldering can be produced.

The quality of the solder is not intrinsically altered if silumin be used instead of lithium.

As no lead is present in the solder, and also no other deleterious constituents, the solder is particularly suitable for the repair of damaged aluminum domestic articles.

What I claim is:

A solder for aluminum and aluminum alloys consisting of 450 parts aluminum, 370 parts tin, 180 parts zinc, 20 parts copper, 15 parts of silicon, 10 parts of lithium or silumin, and 5 parts of iron, as set forth.

In testimony whereof I have signed my name to this specification.

GOTTHILF SCHULDT.